(12) United States Patent
Leyton

(10) Patent No.: US 6,217,045 B1
(45) Date of Patent: Apr. 17, 2001

(54) MASSAGE TABLE CART

(76) Inventor: David L. Leyton, 10014 Louise Ave., Northridge, CA (US) 91325-1521

( * ) Notice: Subject to any disclaimer, the term of this patent is extended or adjusted under 35 U.S.C. 154(b) by 0 days.

(21) Appl. No.: 09/307,539

(22) Filed: May 7, 1999

Related U.S. Application Data
(60) Provisional application No. 60/088,509, filed on Jun. 8, 1998.

(51) Int. Cl.$^7$ ....................................................... B62B 3/02
(52) U.S. Cl. ................. 280/79.7; 280/47.27; 280/47.34; 280/47.371; 280/5.2
(58) Field of Search ................................. 280/5.2, 47.17, 280/47.18, 47.2, 47.24, 47.27, 47.34, 47.35, 47.371, 79.11, 79.3, 79.7

(56) References Cited

U.S. PATENT DOCUMENTS

| | | | |
|---|---|---|---|
| 679,621 | * | 7/1901 | Hulburd ......................... 280/47.27 X |
| 2,621,815 | * | 12/1952 | Gannon ............................ 280/79.3 X |
| 2,736,225 | * | 2/1956 | Marcus ........................... 280/79.11 X |
| 2,846,233 | * | 8/1958 | Burg ................................ 280/79.3 X |
| 3,104,890 | * | 9/1963 | Hill ................................ 280/47.27 X |
| 3,411,798 | * | 11/1968 | Capadalis ...................... 280/47.17 X |
| 3,785,669 | * | 1/1974 | Doheny ............................. 280/47.18 |
| 4,493,492 | * | 1/1985 | Balabanova ................. 280/47.371 X |
| 4,523,774 | * | 6/1985 | Dickerson ..................... 280/47.24 X |
| 4,858,940 | * | 8/1989 | Cheng ............................. 280/47.2 X |
| 4,921,270 | * | 5/1990 | Schoberg ....................... 280/47.27 X |
| 5,536,034 | * | 7/1996 | Miller ............................. 280/47.35 X |

FOREIGN PATENT DOCUMENTS

| | | | |
|---|---|---|---|
| 1117176 | * | 5/1956 | (FR) ................................. 280/79.11 |
| 1301349 | * | 7/1962 | (FR) ................................. 280/47.24 |

* cited by examiner

Primary Examiner—Lanna Mai
Assistant Examiner—Joseph Schell
(74) Attorney, Agent, or Firm—Roger A. Marrs

(57) ABSTRACT

A wheeled cart for transporting various size massage tables from one place to another which includes an elongated base frame having a front end and an opposite end and a pair of spaced-apart side members defining a storage cavity inbetween and separated by several braces on which a massage table is intended to rest. The front end of the base frame includes a cross-member having a cushion element and the rear end of the base frame includes a U-shaped end intended to capture and retain the rear end of the massage table while the opposite or front end of the massage table bears against the cushion element as it rests on the braces between the side members. A U-shaped handle is pivotally attached on the front end of the base frame. A pair of handle side rods interconnect the U-shaped handle with the pivot connections to the base frame. The handle further includes a cushion member which is intended to bear against the rear end of the massage table. Wheels are attached on the front end of the frame, while the rear end includes swivel wheels. A retaining cord or strap may be employed for releasably holding the stored table in position on the base frame.

3 Claims, 2 Drawing Sheets

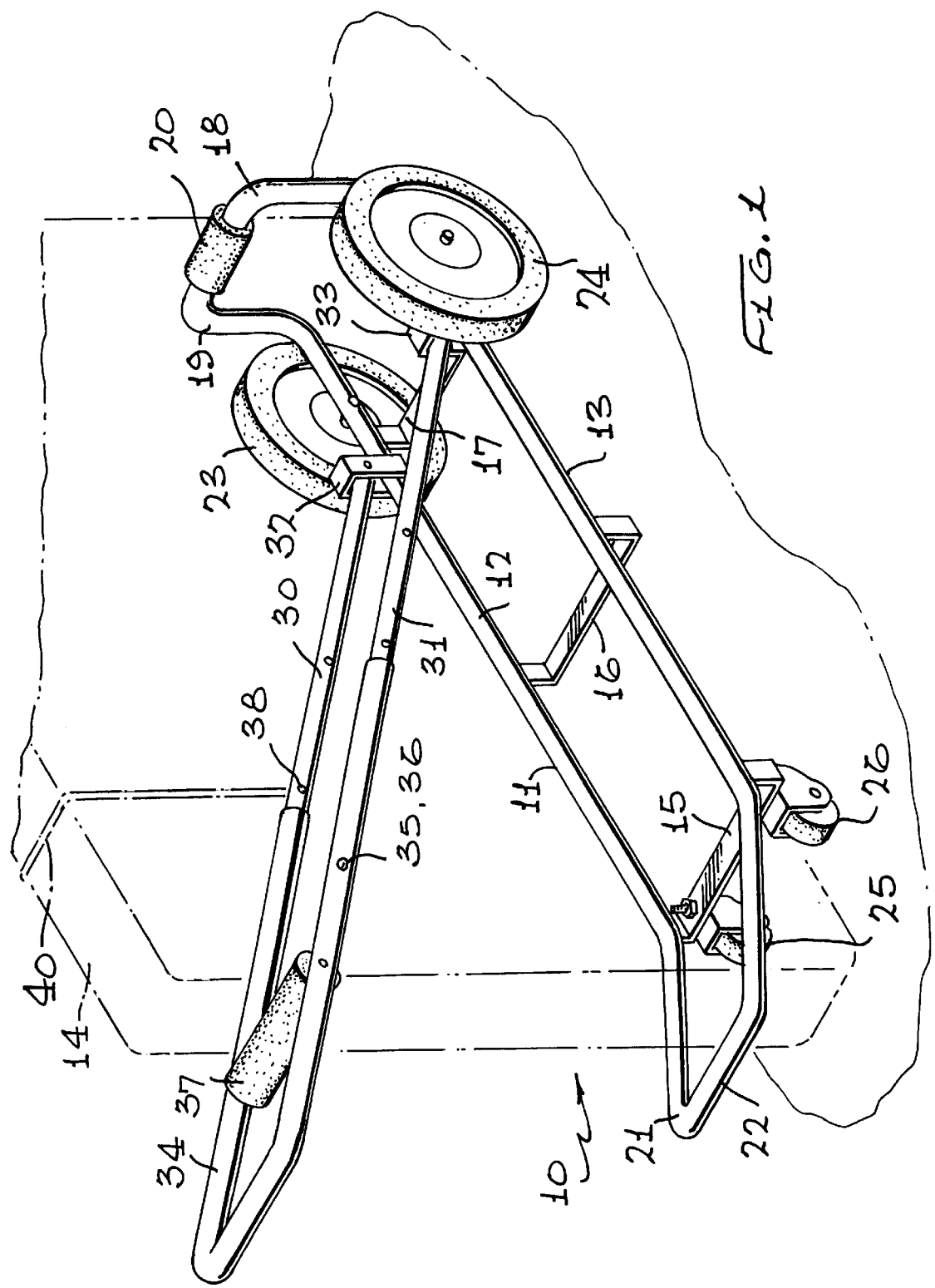

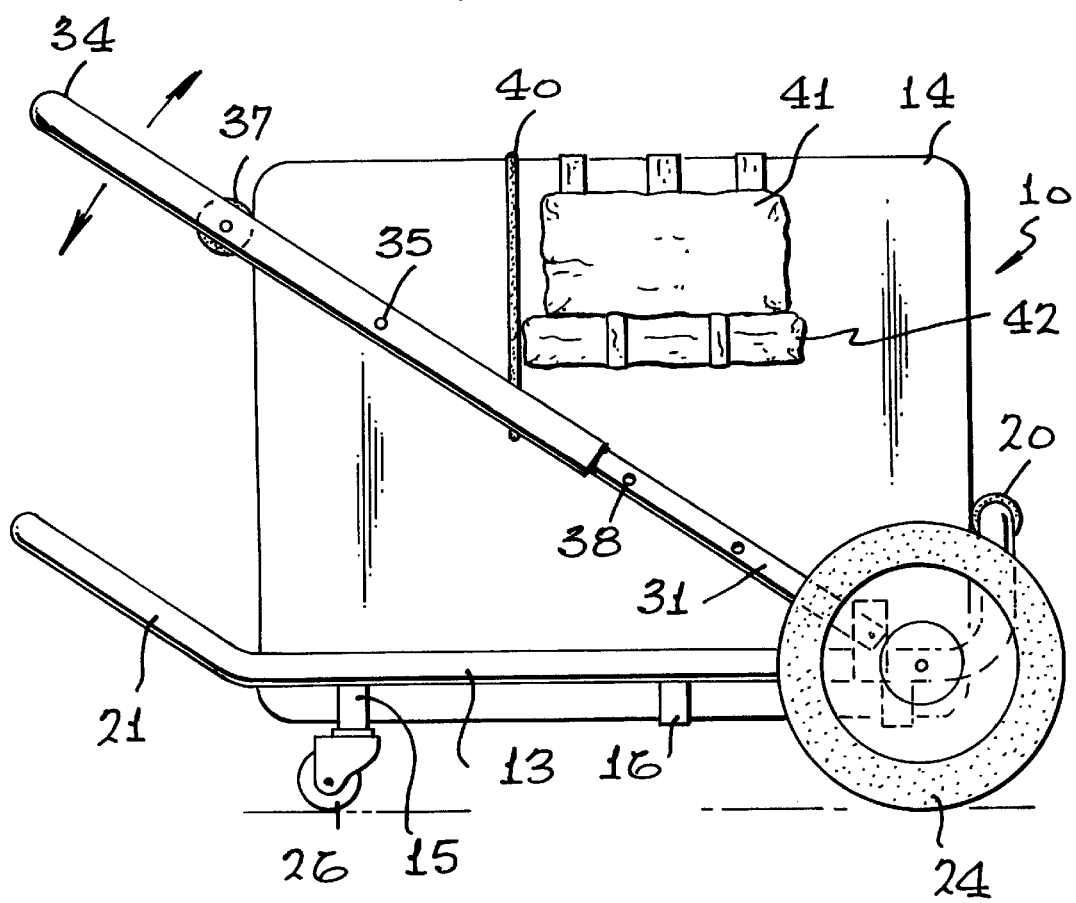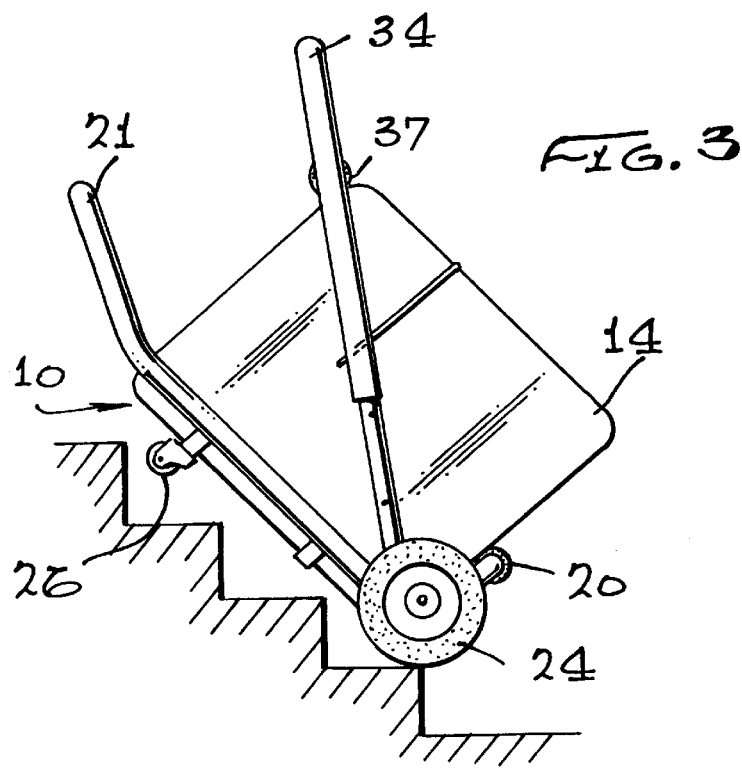

MASSAGE TABLE CART

Priority claimed based on application Ser. No. 60/088,509 filed Jun. 8, 1998.

BACKGROUND OF THE INVENTION

1. Field of the Invention

The present invention relates to the field of cargo transport devices, and more particularly to a novel massage table cart for rollably supporting a massage table so that it may be transported from place to place with convenience and ease.

2. Brief Description of the Prior Art

In the past, massage personnel frequently made appointments for clients in their residence or apartment and travelled to these areas in order to conduct massaging procedures. Normally, a massage table is foldably carried in a transport vehicle, such as a van or truck, and then carried by personnel to the place of use. Generally, conventional massage tables are very awkward, bulky and cumbersome and the act of carrying a massage table from place to place is not only difficult but extremely tiresome. Transport is also difficult when stairs are encountered.

Therefore, a long-standing need has existed to provide a novel wheeled cart for transporting a massage table from place to place wherein stairs may be encountered and wherein several sizes of table can be accommodated. Such a cart is best to be self-contained and should be of unitary construction so that a variety of adjustments can be made without the necessity of disassembly and reassembly with auxiliary parts.

SUMMARY OF THE INVENTION

Accordingly, the above problems and difficulties are avoided by the present invention which provides a novel wheeled cart for hauling or transporting various size massage tables from one place to another and which may include transport up or down a flight of stairs.

The cart incorporating the inventive concept includes an elongated base frame having a front end and an opposite end. The frame includes a pair of side members with a storage cavity inbetween and separated by several braces on which a massage table is intended to rest. The front end of the base frame includes a cross-member having a cushion element and the rear end of the base frame includes a U-shaped end intended to capture and retain the end of the massage table while the opposite end of the massage table bears against the cushion element as it rests on the braces between the side members. A primary feature of the invention includes a pivoted handle which is pivotally attached adjacent to the front end of the base frame while the opposite end from its pivot connection includes a U-shaped handle. A pair of side rods interconnect the U-shaped handle with the pivot connections to the base frame. The handle further includes a cushion member which is intended to bear against the end of the massage table which is retained within the rear end of the base frame. The handle is movably attached on the side elements in telescoping relationship and includes spring-biased fastening members for releasably holding the handle in a fixed position. A pair of wheels is attached on the front end of the frame, while the opposite end includes a pair of swivel or caster wheels. A resilient means, such as a bungee cord or the like, may be employed for releasably retaining a massage table in its storage position on the base frame and the opposite ends of such a cord can be detachably connected to the side elements of the pivoting handle.

Therefore, it is among the primary objects of the present invention to provide a novel means for transporting a massage table easily and conveniently across flat surfaces as well as up and down stairs.

Another object of the present invention is to provide a wheeled carrier or cart for a massage table having a central channel or storage cavity for holding the massage table so that it can be moved or transported from place to place in a convenient manner.

Still a further object of the present invention is to provide a wheeled cart for carrying a massage table which is removably stored in a central channel or cavity on a base frame with an adjustable telescoping arm mechanism adapted to retain the massage table in position as it is transported from place to place on the cart.

Another object resides in providing a wheeled cart having a central storage area for removably holding a massage table which includes cushioned members on the base frame as well as on the telescoping handle wherein the handle is pivotally carried on the frame and serves to support and retain the massage table in position on the frame.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a perspective view of the novel wheeled cart for carrying a massage table in accordance with the present invention;

FIG. 2 is a side-elevational view of the cart shown in FIG. 1; and

FIG. 3 is a side-elevational view in reduced scale illustrating the use-of the wheeled cart in connection with transporting a massage table up or down stairs.

DESCRIPTION OF THE PREFERRED EMBODIMENT

Referring to FIG. 1, the novel massage table cart is the present invention is illustrated in the general direction of arrow 10 which includes an elongated base frame 11 having opposite side members 12 and 13 which are arranged in fixed parallel spaced-apart relationship so as to define a storage channel or cavity therebetween into which a massage table can be placed. The massage table, which does not appear as a part of the present invention, is indicated in broken lines by numeral 14 and is illustrated in the channel between the members 12 and 13 and the underside or bottom of the table rests on braces 15, 16 and 17 which extend transversely across the frame 11 in fixed spaced-apart relationship between the opposite ends thereof. One end of the frame includes a raised end portion 19 having a cross-member 18 on which a cushion 20 is carried. One end of the table 14 bears against the cushion 20 while the opposite end of the table resides between a U-shaped end 21. The opening-in the U-shaped member is coextensive with the channel between the side members 12 and 13. However, although the end of the table 14 resides within the opening at the latter end, the table does not bear against the cross-member, indicated by numeral 22.

One end of the elongated base frame moves on a pair of wheels 23 and 24 that have axles carried on the members 12 and 13 respectively. The opposite end of the base frame includes a pair of swivel or caster wheels 25 and 26 which are carried on the opposite ends of the brace 15. It is also to be noted that the bases 15, 16 and 17 downwardly depend from the side members 12 and 13 so as to further define the channel or cavity into which the table 14 is placed. It is also to be noted that the table as illustrated is in a folded condition and remains folded while it is being transported from place to place by the inventive cart. Upon reaching a place of use, the table is removed from the cart and opened into its operative position.

FIG. 1 further illustrates that the cart 10 includes an elongated handle means taking the form of side elements 30 and 31 having one end of each element attached in a pivotal arrangement with brackets 32 and 33. The elements 30 and 31 are in fixed spaced-apart parallel relationship and are coincident with the channel or cavity defined by the side members 12 and 13 so that when the table is placed in the channel or cavity, the handle means can be pivoted over the table with the upper part of the table residing between the elements 30 and 31. The handle means further includes a U-shaped handle 34 which is arranged in telescoping relationship with respect to ends of elements 30 and 31 so that the handle 34 may be selectively positioned along the length of the elements. In order to releasably retain the handle in the selected position, pushbutton resilient fasteners are employed and are represented in general by numerals 35 and 36 with respect to the opposite sides of the U-shaped handle. Upon depressing of these buttons or resilient fasteners, the handle 34 can be slid on the elements 30 and 31 to the desired location. It is to be particularly noted that the U-shaped handle 34 includes an elongated cushion 37 which extends across the handle and is attached thereto. The cushion 37 will bear against the opposite end of the table 14 from its end bearing against the cushion 20. The handle means is rotated on its pivots downwardly in order to release the table for removal or for installation of the handle into the channel. When the handle means is moved upwardly or in a clockwise direction, the handle will depress until the cushion 37 bears against the end of table 14 and at this instance, the table will be retained between the two cushions 37 and 20.

Referring now in detail to FIG. 2, it can be seen that the massage table 14 may be adjustably carried within the channel or cavity and that its length is compensated for by the rotation of the handle means to where the cushion 37 bears against the end thereof while the opposite end bears against cushion 20. Side elements 30 and 31 include a series of spaced-apart holes, such as hole 38, into which the ends of a bungee cord or resilient element 40 can be placed. The major length of the cord 40 passes the sides of the table 14 and across the top with a spring-bias urging the table 14 into the storage channel so that the bottom of the table will bear against the braces 15–17 inclusive. The table shown in FIG. 2 is of reduced size with respect to the table shown in broken lines in FIG. 1. Therefore, it can be seen that the opening within the end 21 of the base frame will accommodate various lengths or sizes of folding massage tables.

Referring in detail to FIG. 3, it can be seen that the cart 10 may be used for transporting the table 14 up or down a set of stairs. The large wheels 23 and 24 will readily roll over the edge of the steps of the stairs as the cart is pulled upwardly. The user may grasp the cross-member 22 of end 21 on the base frame for pulling purposes or, if pulled along a ground surface as shown in FIG. 2, the user may use the end handle 34 of the pivoting handle means for pulling or manipulating the cart.

Therefore, it can be seen that the transport of a conventional massage table is greatly simplified by the use of the inventive cart 10. The cart 10 is designed to transport a massage table easily and conveniently. By setting the massage table in the channel or cavity so that it rests on the braces 15–17 inclusive, the table can be moved all the way forward against the cushion 20. By adjusting the telescoping handle means for the proper length of the table, the cushion 37 will bear against the opposite end of the table by simply raising the telescoping arm so that the rubber cushion 37 bears against the table. Then, by attaching the bungee cord over the center of the table and connecting the opposite ends of the cord to the telescoping arms, the handle means keeps the arm in the upper position. The cart has caster wheels making it easier to steer on flat surfaces. The cart can also be pivoted onto its larger back wheels making it possible to climb curbs, steps and stairs. The adjustable telescoping handle means allows the cart to carry massage tables that are 36 inches, 37½ inches and 28 inches in length. The versatility and convenience of the cart makes moving a massage table very easy and convenient.

It is to be understood that the bungee cord 40 may be an elongated strap trained over the foldable and which connects at its opposite ends to the handle elements 30 and 31. However, the ends may alternately be releasably attached to the frame side members 12 and 13. Once the folded table resides in the storage cavity on the cart, the exposed and unencumbered top of the table may be employed to support a pair of storage bags and/or other accessories such as a rolled pad or the like. Flexible straps join the pair of bags together and drape over the top of the stored table similar to saddle bags over an animal or saddle as shown in FIG. 2 by numeral 41. Downwardly depending auxiliary straps from beneath the bags may releasably retain the rolled pad 42.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A wheeled cart for transporting a folded massage table from one place to another comprising:

an elongated base frame having wheels and having a front end and a rear end with interconnecting, spaced-apart side members defining a lower storage space between said side members;

brace means connecting said side members together transversely across said defined storage space;

a handle having a grip end and a pivotal end movably connected to said base frame front end;

said handle having a pair of telescoping side sections arranged in fixed parallel spaced-apart relationship to define an upper storage space;

the upper and said lower storage space cooperating to define a central storage area;

a first padded stop transversely mounted across said upper storage space between said side sections;

a second padded stop transversely mounted on said base frame front end between said side members;

said brace means includes at least three braces secured between said side members at a level below the horizontal alignment of said side members;

said base frame rear end terminates in a U-shaped member angularly disposed on said rear end to project to a raised position with respect to said base frame side members; and said base frame front end terminating in an upwardly projecting U-shaped section totally supporting said second padded stop.

2. The wheeled cart as defined in claim 1 including:

an accessory carrying bag having straps for mounting over said central storage area.

3. The wheeled cart as defined in claim 2 including:

at least one stabilizing bungee cord as a releasable retaining strap.

* * * * *